(12) United States Patent
Yu et al.

(10) Patent No.: US 10,845,664 B2
(45) Date of Patent: Nov. 24, 2020

(54) LIQUID CRYSTAL DISPLAY PANEL AND TERMINAL DEVICE

(71) Applicant: WUHAN CHINA STAR OPTOELECTRONICS TECHNOLOGY CO., LTD., Hubei (CN)

(72) Inventors: Wenqiang Yu, Hubei (CN); Chao Wang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/332,382

(22) PCT Filed: Jan. 8, 2019

(86) PCT No.: PCT/CN2019/070880
§ 371 (c)(1),
(2) Date: Mar. 12, 2019

(87) PCT Pub. No.: WO2020/103318
PCT Pub. Date: May 28, 2020

(65) Prior Publication Data
US 2020/0166789 A1    May 28, 2020

(51) Int. Cl.
*G02F 1/1335*        (2006.01)
*G02F 1/1368*        (2006.01)
(Continued)

(52) U.S. Cl.
CPC ...... *G02F 1/1368* (2013.01); *G02F 1/133308* (2013.01); *G02F 1/133526* (2013.01);
(Continued)

(58) Field of Classification Search
CPC ......... G02F 1/133528; G02F 1/133526; G02B 27/0955; H01L 51/5275
See application file for complete search history.

(56) References Cited

U.S. PATENT DOCUMENTS 6,518,656 B1    2/2003    Nakayama et al.
2009/0316083 A1    12/2009    Kishioka
(Continued)

FOREIGN PATENT DOCUMENTS

CN    103076935 A    5/2013
CN    103365354 A    10/2013
(Continued)

*Primary Examiner* — Michael H Caley
*Assistant Examiner* — Mariam Qureshi
(74) *Attorney, Agent, or Firm* — Mark M. Friedman

(57) ABSTRACT

A liquid crystal display panel and a terminal device are provided. The liquid crystal display panel includes a backlight module, a lower polarizer, a thin film transistor (TFT) layer, a liquid crystal layer, a color filter, an upper polarizer, an optical adhesive, and a cover glass which are sequentially disposed. A Fresnel lens is disposed at a position corresponding to a first blind hole by one or more of a computerized numerical control (CNC) machining, a glass injection molding, and a casting. The liquid crystal display panel adjusts externally incoming light into parallel light or concentrating light by providing the Fresnel lens on the cover glass. Therefore, issues of low light transmittance in the blind hole provided under the cover glass is improved.

13 Claims, 1 Drawing Sheet

(51) Int. Cl.
*G02F 1/1333* (2006.01)
*H04M 1/02* (2006.01)
*H04N 5/225* (2006.01)
*G02F 1/1362* (2006.01)

(52) U.S. Cl.
CPC .... *G02F 1/133528* (2013.01); *H04M 1/0264* (2013.01); *H04M 1/0266* (2013.01); *H04N 5/2252* (2013.01); *H04N 5/2253* (2013.01); *G02F 2001/133331* (2013.01); *G02F 2001/136222* (2013.01); *G02F 2202/28* (2013.01)

(56) References Cited

U.S. PATENT DOCUMENTS

| | | | |
|---|---|---|---|
| 2012/0105400 A1* | 5/2012 | Mathew | H04N 5/2251 345/207 |
| 2013/0258234 A1* | 10/2013 | Park | G02F 1/133512 349/58 |
| 2013/0328051 A1* | 12/2013 | Franklin | H01L 29/786 257/59 |
| 2014/0204287 A1 | 7/2014 | Jiang et al. | |
| 2017/0187934 A1* | 6/2017 | Kwak | H04N 5/2251 |
| 2020/0033515 A1* | 1/2020 | Li | G02B 3/08 |

FOREIGN PATENT DOCUMENTS

| | | |
|---|---|---|
| CN | 207636882 U | 7/2018 |
| JP | 2001119006 A | 4/2001 |
| WO | 2008123442 A1 | 10/2008 |

\* cited by examiner

LIQUID CRYSTAL DISPLAY PANEL AND TERMINAL DEVICE

FIELD OF INVENTION

The present disclosure relates to the field of display technologies, and more particularly to a liquid crystal display panel and a terminal device.

BACKGROUND OF INVENTION

Liquid crystals are a special substance between a solid and a liquid. The liquid crystals are an organic compound that is liquid in a normal state, but because its molecular arrangement is as regular as a solid crystal, it is named liquid crystal. Another special property of the liquid crystals is that light can pass through the liquid crystals smoothly when no electric field is applied to the liquid crystals. When an electric field is applied to the liquid crystals, their molecular arrangement changes, and if the liquid crystals are combined with a polarizing plate, the liquid crystals can block a passage of light. If the liquid crystals are combined with a color filter, changing an amount of voltage applied to the liquid crystal can change an amount of light transmission of a certain color, or can change a voltage between two ends of the liquid crystal to change a light transmission of the liquid crystal.

Liquid crystal displays (LCD) work by placing the liquid crystals between two sheets of conductive glass and is driven by an electric field between two electrodes to cause an electric field effect of twist nematic liquid crystal molecules to control a transmission or shielding of a light source, such that light and dark changes occur between power off and on to display an image. If a color filter is added, a color image can be displayed. An alignment film is disposed on two glass substrates, such that the liquid crystal is aligned along a groove. Because a groove of a glass substrate alignment film is offset by 90 degrees, the liquid crystal molecules become a torsion type. When no electric field is applied to the glass substrates, light passes through a polarizing plate, is twisted 90 degrees with the liquid crystal, and passes through a lower polarizing plate, a liquid crystal panel displays white. When an electric field is applied to the glass substrates, the liquid crystal molecules undergo an arrangement change, light is maintained in an original direction through a gap of the liquid crystal molecules, is shielded by the lower polarizing plate, the light is absorbed and cannot pass through the lower polarizing plate, and the liquid crystal panel displays black. The liquid crystal display is based on a presence or absence of the voltage to cause the panel to display.

With the development and progress of the times, a market of a full screen has developed rapidly. Notch screens and waterdrop screens are representatives, which gradually occupy a mainstream of the market, mainly to pursue a higher screen ratio. An idea thereof is to dig a hole on a screen and place a front camera, this increases an active display area and increases a screen ratio of a display screen. In addition, because a size of a non-display area can be reduced, a total size of the display screen is reduced, such that a user can conveniently hold the display screen and enhance a user experience. There are two specific ideas: one idea is a through hole design and the other idea is a blind hole design. The through hole mainly requires special considerations such as process complexity, cost, and glass strength. On the contrary, the blind hole design can avoid these weak points. Although the blind hole is superior to the through hole, it also has its weak point, mainly a glass transmittance of the blind hole, which has a direct influence on a front camera imaging, which affects a camera shooting performance. Therefore, it is a need to provide a new type of liquid crystal display panel, which can use a blind hole design and improve the glass transmittance in the blind hole.

SUMMARY OF INVENTION

An object of an embodiment of the present disclosure is to provide a liquid crystal display panel capable of solving issues of low light transmittance in current blind hole designs.

In order to solve the above issues, an embodiment of the present disclosure provides a liquid crystal display panel. The liquid crystal display panel includes a backlight module, a lower polarizer, a thin film transistor (TFT) layer, a liquid crystal layer, a color filter, an upper polarizer, an optical adhesive, and a cover glass which are sequentially disposed. The optical adhesive is partially recessed downward to define a first blind hole. The cover glass is provided with a Fresnel lens at a position corresponding to the first blind hole.

In an embodiment of the present disclosure, a radius of the Fresnel lens exceeds a radius of the first blind hole in a range of 0 to 5 mm.

In an embodiment of the present disclosure, the first blind hole is recessed downwardly and goes through the upper polarizer to reach a surface of the color filter.

In an embodiment of the present disclosure, the lower polarizer is recessed downward at a position corresponding to the first blind hole to define a second blind hole.

In an embodiment of the present disclosure, the second blind hole is recessed downwardly and goes through the backlight module.

In an embodiment of the present disclosure, a method of fabricating the Fresnel lens comprises one or more of a computerized numerical control (CNC) machining, a glass injection molding, and a casting.

An embodiment of the present disclosure further provides a terminal device including a body provided with the liquid crystal display panel.

In an embodiment of the present disclosure, the terminal device further includes a camera disposed in the body, the camera is positioned directly below the first blind hole, and a light incident side of the camera faces the lower polarizer.

In an embodiment of the present disclosure, the camera is disposed in the second blind hole.

In an embodiment of the present disclosure, the terminal device further includes one or more of a mobile phone, a tablet, and a mobile communication device.

A liquid crystal display panel and a terminal device are provided. A Fresnel lens is disposed at a position corresponding to a first blind hole by one or more of a computerized numerical control (CNC) machining, a glass injection molding, and a casting. The Fresnel lens light into parallel light or concentrating light. The Light enters a light entrance of a camera through the first blind hole, a color filter, a liquid crystal layer, a thin film transistor (TFT) layer, and a second blind hole, light transmittance at a cover glass is increased, this avoids affecting an imaging of the camera and improves a camera shooting performance.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DETAILED DESCRIPTION OF PREFERRED EMBODIMENTS

Figure 1:
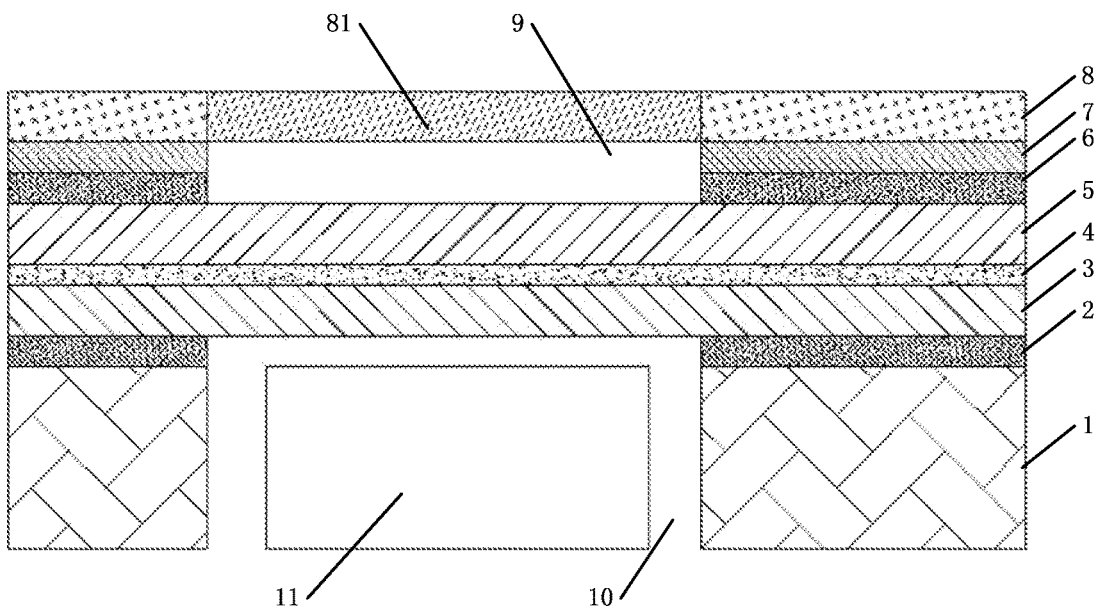
FIG. 1 is a schematic structural diagram of a body of a terminal device according to an embodiment of the present disclosure.

The preferred embodiments of the present disclosure are described in detail below with reference to the accompanying drawings, in which those skilled in the art will more readily understand how to implement the disclosure. The present disclosure, however, may be embodied in many different forms of embodiments, and the scope of the present disclosure is not limited to the embodiments described herein. The description of the embodiments below is not intended to limit the scope of the present disclosure.

Directional terms mentioned in the present disclosure, such as "top", "bottom", "front", "rear", "left", "right", "inside", "outside", "side", etc., are only directional terms used in the drawings. The directional terms used herein are used to explain and explain the present disclosure and are not intended to limit the scope of the present disclosure.

In the drawings, structurally identical components are denoted by same reference numerals, and structural or functionally similar components are denoted by similar reference numerals. Moreover, a size and thickness of each component shown in the drawings are arbitrarily shown for ease of understanding and description, and the present disclosure does not limit the size and thickness of each component.

When a component is described as "on" another component, the component can be placed directly on the another component. There can also be an intermediate component, the component is placed on the intermediate component, and the intermediate component is placed on the another component. When a component is described as "mounted to" or "connected to" another component, it can be understood as either directly "mounted to" or "connected to", or a component is "mounted to" or "connected to" another component through an intermediate component.

As illustrated in FIG. 1, an embodiment of the present disclosure provides a terminal device including a body. A camera 11 and a liquid crystal display panel are disposed on the body.

The liquid crystal display panel includes a backlight module 1, a lower polarizer 2, a thin film transistor (TFT) layer 3, a liquid crystal layer 4, a color filter 5, an upper polarizer 6, an optical adhesive 7, and a cover glass 8 which are sequentially disposed.

The backlight module 1 mainly includes a light source, a light guide plate, an optical film, a plastic frame, and the like. Because a liquid crystal display is a passive light-emitting element, a display screen itself does not emit light, therefore it needs to be illuminated by the backlight module 1 below the display screen.

A basic structure of the lower polarizer 2 includes an intermediate polyvinyl alcohol (PVA), two layers of triacetate (TAC), a pressure sensitive adhesive (PSA) film, a release film, and a protective film. The PVA film is a high molecular polymer, which is dyed with various organic dyes with dichroism, and is extended under certain humidity and temperature conditions to absorb the dichroic dye to form polarization properties. After dehydration and drying, a polarizer original film is formed. Because the PVA film is hydrophilic, the PVA film will quickly deform, shrink, relax, decay, and has low strength in a hot and humid environment, which is brittle and fragile, and is not convenient for practical use and processing. Therefore, it is a need to form a layer of TAC film with high strength, high light transmittance, and heat and humidity resistance on two sides of the TAC film, thereby forming a polarizing plate original plate. A role of the polarizer is to make natural light into linearly polarized light.

A thin film transistor (TFT) functions to actively control each pixel device, which is equivalent to designing a field effect switch tube at each pixel point, and multiple TFTs constitute the TFT layer 3.

A basic structure of the color filter (CF) 5 includes a glass substrate, a black matrix, a color layer, a protective layer, and an indium tin oxide (ITO) conductive film. The color filter is an optical filter configured to display color. The color filter can precisely select a small range of light waves to be passed and reflect other light waves that are not desired to be passed.

A basic structure of the lower polarizer 6 is same as the basic structure of the lower polarizer 2. In order to realize that the liquid crystal panel can display an image, the upper polarizer 6 and the lower polarizer 2 are required to coexist.

The optical adhesive 7 is a special adhesive configured to bond optical components in a transparent liquid crystal display panel.

The optical adhesive 7 is partially recessed downward to define a first blind hole 9, and the first blind hole 9 is recessed downwardly and goes through the upper polarizer 6 to reach a surface of the color filter 5. The lower polarizer 2 is recessed downward at a position corresponding to the first blind hole 9 to define a second blind hole 10. The second blind hole 10 is recessed downwardly and goes through the backlight module 1.

The cover glass 8 is configured to protect other optical components from being damaged by dust, moisture in the air, and the like. A Fresnel lens 81 is disposed at a position corresponding to the first blind hole by one or more of a computerized numerical control (CNC) machining, a glass injection molding, and a casting. A radius of the Fresnel lens 81 is greater than a radius of the first blind hole 9. An outer dimension of the Fresnel lens 81 is slightly greater than an outer dimension of the first blind hole 9, such that a better concentrating performance can be achieved. In details, a radius of the Fresnel lens exceeds a radius of the first blind hole in a range of 0 to 5 mm.

In an embodiment of the present disclosure, a method of fabricating the Fresnel lens comprises one or more of a computerized numerical control (CNC) machining, a glass injection molding, and a casting.

The camera 11 is positioned in the second blind hole 10, the camera 11 is positioned directly below the first blind hole, and a light incident side of the camera 11 faces the lower polarizer 2, and external light passes through the Fresnel lens 81 of the cover glass 8, the first blind hole 9, the color filter 5, the liquid crystal layer 4, the TFT layer 3, and the second blind hole 10, and enters a light entrance of the camera 11, and then the camera 11 receives an incoming light from the outside to form an image.

Figure 2:
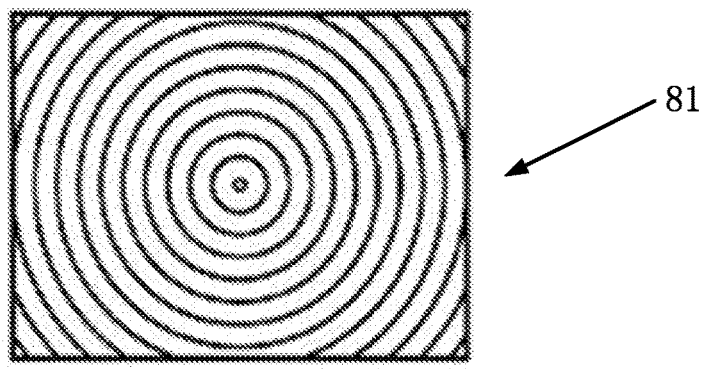
FIG. 2 is a top plan view of a Fresnel lens according to an embodiment of the present disclosure.
Figure 3:
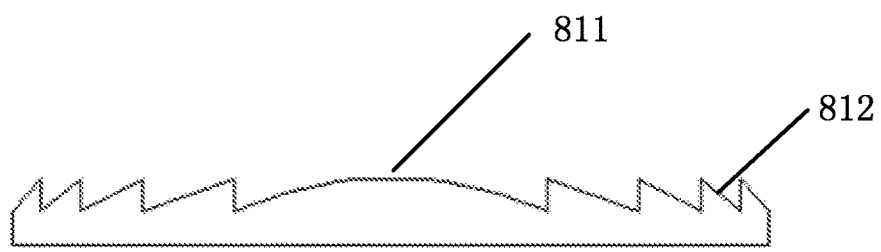
FIG. 3 is a cross-sectional view of a Fresnel lens according to an embodiment of the present disclosure.

As illustrated in FIGS. 2 and 3, a top view of the Fresnel lens 81 includes concentric circles having diameters from small to large. An upper surface of a cross-sectional view of the Fresnel lens 81 includes an elliptical arc 811 and a zigzag groove 812, and a lower surface of the cross-sectional view of the Fresnel lens 81 is a smooth flat surface. Therefore, each zigzag groove 812 can be viewed as a separate small lens that modulates light into parallel light or concentrating light. Compared with an ordinary convex lens, a part thereof that is linearly propagated is removed, and only a curved surface thereof where a refraction is generated is retained, this can save a large amount of materials thereof and achieve a same concentrating performance, thereby avoiding a phenomenon that corners thereof are darkened and blurred, thereby improving light transmission of the cover glass 8.

In an embodiment of the present disclosure, the terminal device further includes a mobile phone, a tablet, or other mobile communication device.

The liquid crystal display panel and the terminal device provided by embodiment of the present discourse have been described in detail above. It is understood that the exemplary embodiments described herein are to be considered as merely illustrative in order to facilitate an understanding of the method and a core idea of the present discourse and are not intended to limit the present discourse. Descriptions of features or aspects in each exemplary embodiment should generally be considered as suitable features or aspects in other exemplary embodiments. While the present discourse has been described with reference to the preferred embodiments thereof, various modifications and changes can be made by those skilled in the art. Any modifications, equivalent substitutions and improvements made within the spirit and scope of the present discourse are intended to be included within the protection scope of the present discourse.

The invention claimed is:

1. A liquid crystal display panel, comprising:
a backlight module;
a lower polarizer disposed on the backlight module;
a thin film transistor (TFT) layer disposed on the lower polarizer;
a color filter disposed on the TFT layer;
a liquid crystal layer disposed between the TFT layer and the color filter;
an upper polarizer disposed on the color filter;
an optical adhesive disposed on the upper polarizer;
a cover glass disposed on the optical adhesive; and
a camera;
wherein the optical adhesive is partially recessed downward to define a first blind hole;
wherein the cover glass is provided with a Fresnel lens at a position corresponding to the first blind hole;
wherein light passes through the Fresnel lens to be adjusted into parallel light or focused light, the parallel light or focused light passes through the first blind hole, the color filter, the liquid crystal layer, the TFT layer, and a second blind hole and enters a light entrance of the camera, and then the camera receives the parallel light or focused light to form an image, a configuration of the Fresnel lens, the first blind hole, the color filter, the liquid crystal layer, the TFT layer, the second blind hole, and the camera allows impact on imaging of the camera to be avoided.

2. The liquid crystal display panel according to claim 1, wherein a radius of the Fresnel lens exceeds a radius of the first blind hole in a range of 0 to 5 mm.

3. The liquid crystal display panel according to claim 1, wherein the first blind hole is recessed downwardly and goes through the upper polarizer to reach a surface of the color filter.

4. The liquid crystal display panel according to claim 1, wherein the lower polarizer is recessed downward at a position corresponding to the first blind hole to define a second blind hole.

5. The liquid crystal display panel according to claim 4, wherein the second blind hole is recessed downwardly and goes through the backlight module.

6. A terminal device, comprising:
a body; and
a liquid crystal display panel disposed on the body, the liquid crystal display panel comprising:
a backlight module;
a lower polarizer disposed on the backlight module;
a thin film transistor (TFT) layer disposed on the lower polarizer;
a color filter disposed on the TFT layer;
a liquid crystal layer disposed between the TFT layer and the color filter;
an upper polarizer disposed on the color filter;
an optical adhesive disposed on the upper polarizer;
a cover glass disposed on the optical adhesive; and
a camera disposed in the body;
wherein the optical adhesive is partially recessed downward to define a first blind hole;
wherein the cover glass is provided with a Fresnel lens at a position corresponding to the first blind hole;
wherein light passes through the Fresnel lens to be adjusted into parallel light or focused light, the parallel light or focused light passes through the first blind hole, the color filter, the liquid crystal layer, the TFT layer, and a second blind hole and enters a light entrance of the camera, and then the camera receives the parallel light or focused light to form an image, a configuration of the Fresnel lens, the first blind hole, the color filter, the liquid crystal layer, the TFT layer, the second blind hole, and the camera allows impact on imaging of the camera to be avoided.

7. The terminal device according to claim 6, wherein a radius of the Fresnel lens exceeds a radius of the first blind hole in a range of 0 to 5 mm.

8. The terminal device according to claim 6, wherein the first blind hole is recessed downwardly and goes through the upper polarizer to reach a surface of the color filter.

9. The terminal device according to claim 6, wherein the lower polarizer is recessed downward at a position corresponding to the first blind hole to define a second blind hole.

10. The terminal device according to claim 9, wherein the second blind hole is recessed downwardly and goes through the backlight module.

11. The terminal device according to claim 9, wherein the camera is disposed in the second blind hole.

12. The terminal device according to claim 6, wherein the camera is positioned directly below the first blind hole, and a light incident side of the camera faces the lower polarizer.

13. The terminal device according to claim 6, wherein the terminal device is one of a mobile phone, a tablet, and a mobile communication device.

* * * * *

UNITED STATES PATENT AND TRADEMARK OFFICE
CERTIFICATE OF CORRECTION

Page 1 of 1

PATENT NO. : 10,845,664 B2
APPLICATION NO. : 16/332382
DATED : November 24, 2020
INVENTOR(S) : Wenqiang Yu and Chao Wang It is certified that error appears in the above-identified patent and that said Letters Patent is hereby corrected as shown below:

On the Title Page

Please add the following:
"(30) Foreign Application Priority Data
November 22, 2018 (CN) 201811401978.3"

Signed and Sealed this
First Day of June, 2021

Drew Hirshfeld
*Performing the Functions and Duties of the
Under Secretary of Commerce for Intellectual Property and
Director of the United States Patent and Trademark Office*